(12) United States Patent
Kirillov

(10) Patent No.: US 9,275,133 B1
(45) Date of Patent: Mar. 1, 2016

(54) CONTENT REQUEST IDENTIFICATION VIA A COMPUTER NETWORK

(71) Applicant: Google Inc., Mountain View, CA (US)

(72) Inventor: Roman Kirillov, London (GB)

(73) Assignee: Google Inc., Mountain View, CA (US)

(*) Notice: Subject to any disclaimer, the term of this patent is extended or adjusted under 35 U.S.C. 154(b) by 254 days.

(21) Appl. No.: 14/078,929

(22) Filed: Nov. 13, 2013

(51) Int. Cl.
*G06F 17/00* (2006.01)
*G06F 17/30* (2006.01)

(52) U.S. Cl.
CPC .................. *G06F 17/30705* (2013.01)

(58) Field of Classification Search
CPC ............ G06F 17/30643; G06F 17/30705; G06F 17/3053
See application file for complete search history.

(56) References Cited

U.S. PATENT DOCUMENTS

| | | | |
|---|---|---|---|
| 7,788,132 B2 | 8/2010 | Desikan et al. | |
| 8,463,830 B2 | 6/2013 | Criou et al. | |
| 2005/0144158 A1* | 6/2005 | Capper | G06F 17/30696 |
| 2006/0242013 A1* | 10/2006 | Agarwal | G06Q 30/02 |
| | | | 705/14.49 |
| 2006/0242147 A1* | 10/2006 | Gehrking | G06F 17/30707 |
| 2007/0011146 A1* | 1/2007 | Holbrook | G06Q 30/0603 |
| 2008/0016218 A1* | 1/2008 | Jones | G06F 17/30873 |
| | | | 709/226 |
| 2009/0006375 A1* | 1/2009 | Lax | H04N 21/435 |
| 2009/0248514 A1* | 10/2009 | Pang | G06Q 30/0256 |
| | | | 705/14.54 |
| 2012/0265588 A1 | 10/2012 | Kannan et al. | |

* cited by examiner

*Primary Examiner* — James Trujillo
*Assistant Examiner* — Jessica N Le
(74) *Attorney, Agent, or Firm* — Foley & Lardner LLP; John D. Lanza

(57) ABSTRACT

Systems and methods of identifying information resources for content item placement via a computer network are provided. A data processing system can identify clusters associated with an information resource, and determine a weight of the plurality of clusters for the information resource. An association metric for the information resource can be determined, and the information resource can be identified as a specialized information resource based on the association metric. The data processing system can select a placement criterion for a content item based on information received from a content provider computing device via the computer network, or information received from a network session between at least one end user computing device and at least one content publisher computing device via the computer network. Based on the placement criterion, the specialized information resource can be selected as a candidate for placement of the content item.

20 Claims, 7 Drawing Sheets

FIG. 5

CONTENT REQUEST IDENTIFICATION VIA A COMPUTER NETWORK

BACKGROUND

In a computer networked environment such as the internet, entities such as people or companies provide information for public display on web pages or other online documents. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a computer implemented method of identifying information resources for content item placement via a computer network. The method includes identifying, by a data processing system, a plurality of clusters associated with an information resource. Each cluster of the plurality of clusters includes a plurality of keywords. The method determines, by the data processing system, a weight of each of the plurality of clusters for the information resource based at least in part on the plurality of keywords, and determines, by the data processing system, an association metric for the information resource based on at least one of a number of the plurality of clusters and the weight of each of the plurality of clusters. The method identifies, by the data processing system, the information resource as a specialized information resource based on the association metric. The method selects, by the data processing system, a placement criterion for a content item based on at least one of, information received by the data processing system from a content provider computing device via the computer network; and information received by the data processing system from a network session between at least one end user computing device and at least one content publisher computing device via the computer network. The method selects, based on the placement criterion, the specialized information resource as a candidate for placement of the content item.

At least one aspect is directed to a system of filtering information resources for content item placement via a computer network. The system includes a data processing system that can identify a plurality of clusters associated with an information resource. Each cluster of the plurality of clusters can include a plurality of keywords. The data processing system can determine a weight of each of the plurality of clusters for the information resource based at least in part on the plurality of keywords, and can determine an association metric for the information resource based on at least one of a number of the plurality of clusters and the weight of each of the plurality of clusters. The data processing system can identify the information resource as a specialized information resource based on the association metric. The data processing system can identify a placement criterion for a content item based on at least one of information received from a content provider computing device via the computer network, and information received from a network session between at least one end user computing device and at least one content publisher computing device via the computer network. The data processing system can select the specialized information resource as a candidate for placement of the content item via the computer network based on the placement criterion.

At least one aspect is directed to a computer readable storage medium device storing instructions that when executed by one or more data processors, cause the one or more data processors to perform operations. The operations include identifying a plurality of clusters associated with an information resource, each cluster of the plurality of clusters including a plurality of keywords, and determining a weight of each of the plurality of clusters for the information resource based at least in part on the plurality of keywords. The operations include determining an association metric for the information resource based on at least one of a number of the plurality of clusters and the weight of each of the plurality of clusters, and identifying the information resource as a specialized information resource based on the association metric. The operations include identifying a placement criterion for a content item based on at least one of information received by the data processing system from a content provider computing device via the computer network, and information received by the data processing system from a network session between at least one end user computing device and at least one content publisher computing device via the computer network. The operations include selecting the specialized information resource as a candidate for placement of the content item via the computer network based on the placement criterion.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is a display depicting one example environment to identify information resources for content item placement, according to an illustrative implementation;

DETAILED DESCRIPTION

Figure 1:
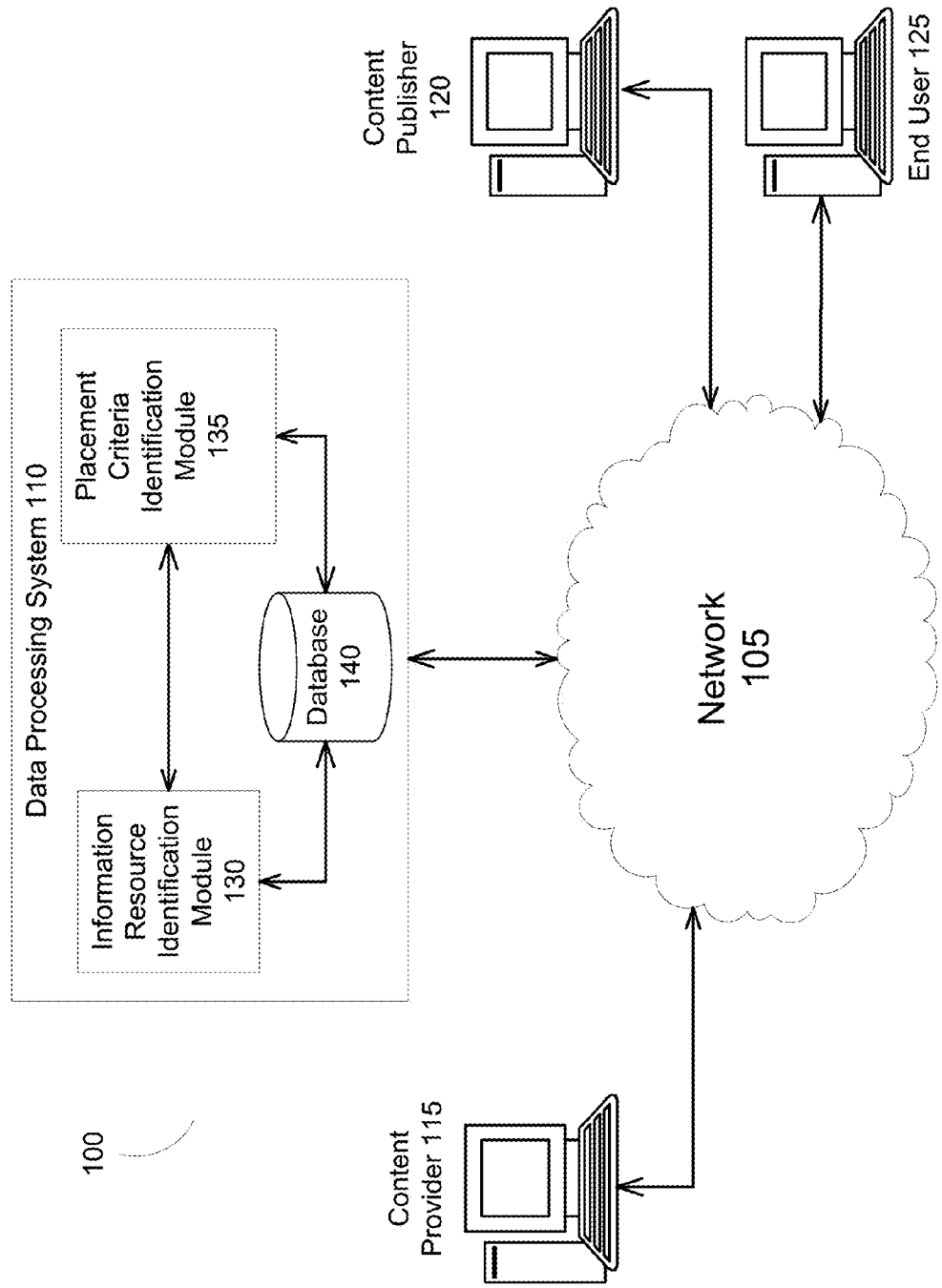
FIG. 1 is a block diagram depicting one example environment to identify information resources for content item placement, according to an illustrative implementation.

Following below are more detailed descriptions of various concepts related to, and implementations of, methods, apparatuses, and systems of providing information via a computer network. The various concepts introduced above and discussed in greater detail below may be implemented in any of numerous ways, as the described concepts are not limited to any particular manner of implementation.

Systems and methods of the present disclosure relate generally to identifying information resources such as websites as candidates for the placement of content items such as advertisements. For example, as part of an online content item placement campaign, a content provider (e.g., an advertiser) may attempt to place content items (e.g., ads) for display with information resources (e.g., websites) that are viewed by end users who may be interested in the subject matter of the content item. For example, end users who like cats may visit a website about cats. A content provider seeking to place content items that offer cat food for sale may wish to have such a content item placed on the website about cats, as viewers of that website may own cats and have a need to buy cat food. An end user viewing the cats website can click on the cat food content item to navigate to a website of the content provider where they can buy cat food, for example.

Content providers may not possess sufficient information to identify information resources most suitable for their content items. Further, content providers may also have content items suitable for display on specialized information resources. For example, a content item related to cat food may be better suited for display with an information resource about nutritional requirements for domestic cats, rather than an information resource about tigers or animals in general.

In some implementations, a data processing system such as a server used to create an online content item placement campaign can identify topics or subject matter of information resources and determine that an information resource is specialized or focused on one or a narrow set of topics. Such specialized information resources focus on a smaller number of topics and can be smaller or receive less traffic than general information resources that span a larger number of topics. For example, a specialized website dedicated to domestic cats may have fewer online documents (e.g., web pages) than a general website about all felines in the animal kingdom. The specialized domestic cats website in this example may have fewer views by end users than the general website, but the end users visiting the domestic cats website may have a greater likelihood to click a content item for cat food relative to a larger pool of end users who view the general feline website.

To identify specialized information resources, for example, the data processing system can identify a number of clusters (e.g., groups of keywords) or topics associated with the information resource, and can assign a weight to the clusters indicative of the strength of the association between a cluster and the information resource. Based on these weights and other factors such as the number of clusters associated with an information resource, the data processing system can determine that an information resource has a high correlation with a limited number of clusters relative to a threshold or relative to other information resources. The data processing system can designate such information resources as specialized information resources. Other information resources that are also associated with these clusters, but with lower weights indicating a weaker association between the clusters and the information resource, or that are associated with these clusters but are also associated with a large number of additional clusters, can be filtered out by the data processing system as general information resources that are not selected as candidates for the display of content items during the creation of a content item placement campaign.

In addition to identifying specialized information resources, the data processing system can select specialized information resources as candidates for display of content items, based, for example, on a correlation between the subject matter of the content items and the subject matter of the specialized information resource. The correlation can be determined based on information received by the data processing system from a content provider computing device, e.g., during the creation of an online content item placement campaign. The correlation can also be determined by the data processing system based on computer network (e.g., internet) activity such as views of information resources by end user computing devices, clicks on content items, or search result activity. Thus, as part of the creation of an online content item placement campaign, the data processing system can identify specialized information resources suitable for placement of content items. An indication of these specialized information resources can be provided from the data processing system to a content provider computing device during creation of the placement campaign for display to the content provider as candidates that the content provider may select for inclusion in the placement campaign.

FIG. 1 illustrates an example system 100 for identifying information resources as candidates for content item placement via at least one computer network, such as the network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having a processor to communicate via the network 105, for example with at least one content provider computing device 115, at least one content publisher computing device 120, or at least one end user computing device 125.

The data processing system 110 can include at least one server. For example, the data processing system 110 can include a plurality of servers located in at least one data center or server farm. In one implementation, the data processing system 110 includes a content placement system, e.g., an ad server or ad placement system. For example, the data processing system 110 can include at least one information resource identification module 130, at least one placement criteria identification module 135, and at least one database 140. The information resource identification module 130 and the placement criteria identification module 135 can each include at least one processing unit, server, circuit, engine, agent, or other logic device such as programmable logic arrays configured to communicate with the database 140 and with other computing devices (e.g., the content provider computing device 115, the content publisher computing device 120, or the end user computing device 125) via the network 105. The information resource identification module 130 and the placement criteria identification module 135 can include or execute at least one computer program or at least one script. The information resource identification module 130 and the placement criteria identification module 135 can be separate components, a single component, or part of the data processing system 110. The information resource identification module 130 and the placement criteria identification module 135 can include combinations of software and hardware, such as one or more processors configured to execute one or more scripts to detect or identify specialized information resources and to select specialized information resources as candidates for placement of content items.

The content provider computing devices 115 can include servers or other computing devices operated by a content provider entity to provide content items such as advertisements for display on information resources at the end user computing device 125. The content provided by the content provider computing device 115 can include third party content items (e.g., ads) for display on information resources such as a website or web page that includes primary content, e.g. content provided by the content publisher computing device 120. The content items can also be displayed on a search results web page. For example, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For example, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing device 115. For example, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, end user computing devices, consumer computing device, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The data processing system 110 can include the information resource identification module 130 and the placement criteria identification module 135 as part of one or more servers of an online content item placement campaign generation system to identify specialized information resources associated with content publisher computing devices 120 as candidates for placement of content items associated with content provider computing devices 115, for example as part of a content item placement campaign via the network 105. For example, the information resource identification module 130 can be part of, or can include scripts executed by, one or more servers in a content placement system configured to identify specialized information resources based, for example, on the number or depth of topics included in information resources. For example, by comparing a correlation with identified topics (as indicated by clusters and weights assigned to clusters) to a threshold, or based on other factors such as a size of an information resource, number or rate of views of an information resource, or a number of identified topics of an information resource, the information resource identification module 130 can identify information resources as specialized information resources or as general non-specialized information resources. Specialized information resources having subject matter relevant to the subject matter of ads or other content items can be identified by the data processing system 110 and selected during creation of a content item placement campaign as candidates for display of the content item during implementation of the placement campaign.

The placement criteria identification module 135 can be part of the same or a different server as the information resource identification module 130 in the data processing system 110, e.g., a content placement system. The placement criteria identification module 135 can identify placement criteria for content items based on data received from the content provider computing devices 115, or activity associated with information resources of the content publisher computing devices 120, such as rendering data associated with views of the information resources by the end user computing devices 125 or other activity of the end user computer devices 125 via the network 105.

In some implementations, to identify information resources suitable for the placement of content items, e.g., as part of an online content item placement campaign, the data processing system 110 can identify one or more clusters associated with an information resource. A cluster, for example, can include a group of keywords having semantic, topical, or subject matter similarity. For example, for an information resource such as a website about cats the data processing system 110 can identify a "housecat" cluster having keywords such as "cat" "kitten" "domestic cat" or "British shorthair cat." The data processing system 110 can also identify other clusters associated with the same example website about cats such as a "cat care" cluster having keywords such as "litter box" "catnip" and "cat toys", or a "cat health" cluster having keywords such as "cat food" "cat exercise" or "cat veterinarian."

The clusters associated with the information resource can be obtained from the database 140. For example, the data processing system 110 can obtain keywords or meta data from the information resource, e.g. via network 105 communication between the data processing system 110 and the content publisher computing device 120. The keywords or meta data can indicate topics or subject matter of the information resource, and the data processing system 110 can select corresponding clusters from a registry of clusters stored in the database 140. In some implementations, information resources include cluster information, such as meta data that includes an identification of a particular cluster associated with the information resource, and the data processing system 110 identifies clusters from this cluster information.

The data processing system 110 can determine a weight of each cluster of the one or more clusters associated with the information resource. The weight can indicate how strongly the cluster is represented in the content of the information resource. For example, based on keywords of a cluster and the subject matter of the information resource, the data processing system 110 can assign a weight to a cluster for that information resource. The data processing system 110 (or a component thereof such as the information resource identification module 130) can obtain information about the subject matter of the information resource from meta data of the information resource, from an analysis of the content of the information resource, from network 105 communication between the data processing system 110 and the content publisher computing device 120, or from the database 140. The data processing system 110 can obtain information about the cluster, such as keywords that are included in the cluster, from the database 140, for example. Based, for example, on variances in information resource subject matter, a cluster can have one weight for a first information resource and the same cluster can be assigned a different weight for a second information resource.

Referring to the information resource about cats (e.g., a website about cats) the data processing system 110 can identify both the "housecat" cluster having keywords such as "cat" "kitten" "domestic cat" or "British shorthair cat" and a "feline" cluster having keywords "lion" "tiger" "wildcat" and "cat" as being associated with the cats website based on the content of the clusters and the content of the cats website. The data processing system 110 can also determine a weight for both the "housecat" cluster and the "feline" cluster for the cats website that indicates a strength or degree of association between the clusters and the information resource. In this example, based on subject matter of the cats website (e.g., limited to domestic cats and not wild animals), the data processing system 110 can determine that the "housecat" cluster is more closely associated with the cats website than the "feline" cluster" and can assign a higher or greater a weight to the "housecat" cluster relative to the "feline" cluster. While both clusters are associated with the cats website, the housecat cluster has a stronger association with the cats website in this example.

Figure 2:
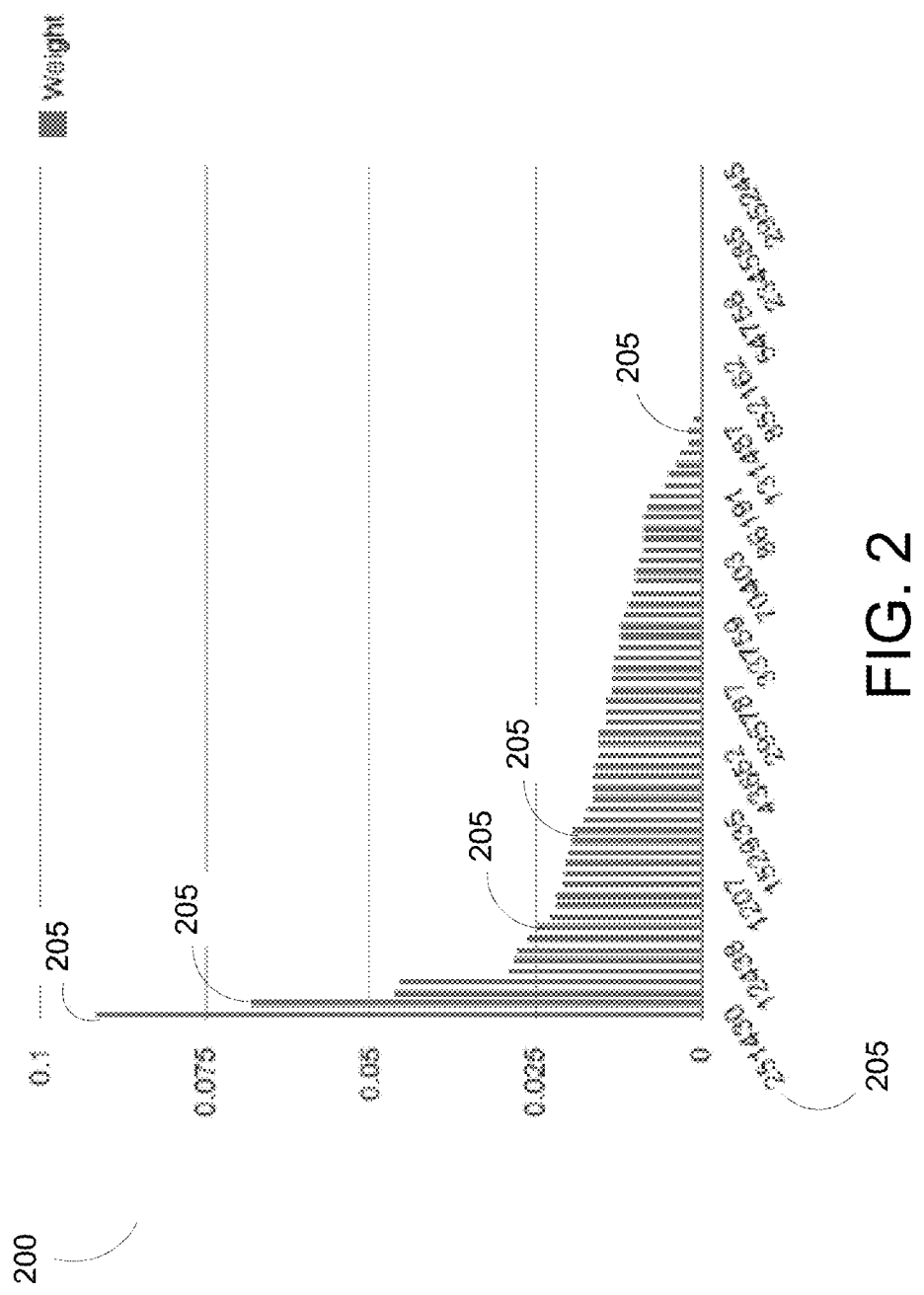
FIG. 2 is a display depicting cluster distribution associated with an information resource, according to an illustrative implementation.

The weight of a cluster for an information resource, determined by the data processing system 110 can be a number on a scale, such as from zero to one. For example, FIG. 2 depicts a cluster distribution chart 200 associated with an information resource, where each vertical bar depicts a weight of one cluster 205 of a plurality of clusters 205 that the data processing system 110 has identified as being associated with an information resource. In the example of FIG. 2, the horizontal axis depicts a plurality of clusters 205, with some of the clusters 205 being identified by a reference number, and the vertical axis indicates the weight of the clusters 205. For example, the cluster 205 having cluster identification number 251430, represented by the furthest vertical bar on the left of the distribution chart 200 has a weight of nearly 0.1. Of the clusters 205 identified by the data processing system 110 as being related to the information resource, (e.g., those depicted in FIG. 2), this cluster 205 is the cluster having the strongest association with the information resource. The cluster 205 having cluster identification number 131487, represented by the furthest vertical bar on the right of the distribution chart 200 has a weight of nearly zero and, of the clusters 205 identified by the data processing system 110 as being related to the information resource, is the cluster with the weakest association with the information resource in this example. The cluster 205 that is second from the left as depicted in the sample of FIG. 2, with a weight between 0.05 and 0.075 is the cluster having the second strongest correlation with the information resource. In the example of FIG. 2, not all clusters 205, whose weights are represented by vertical bars in FIG. 2, are explicitly labeled as clusters 205, and identification numbers are not indicated for every cluster 205.

Figure 3:
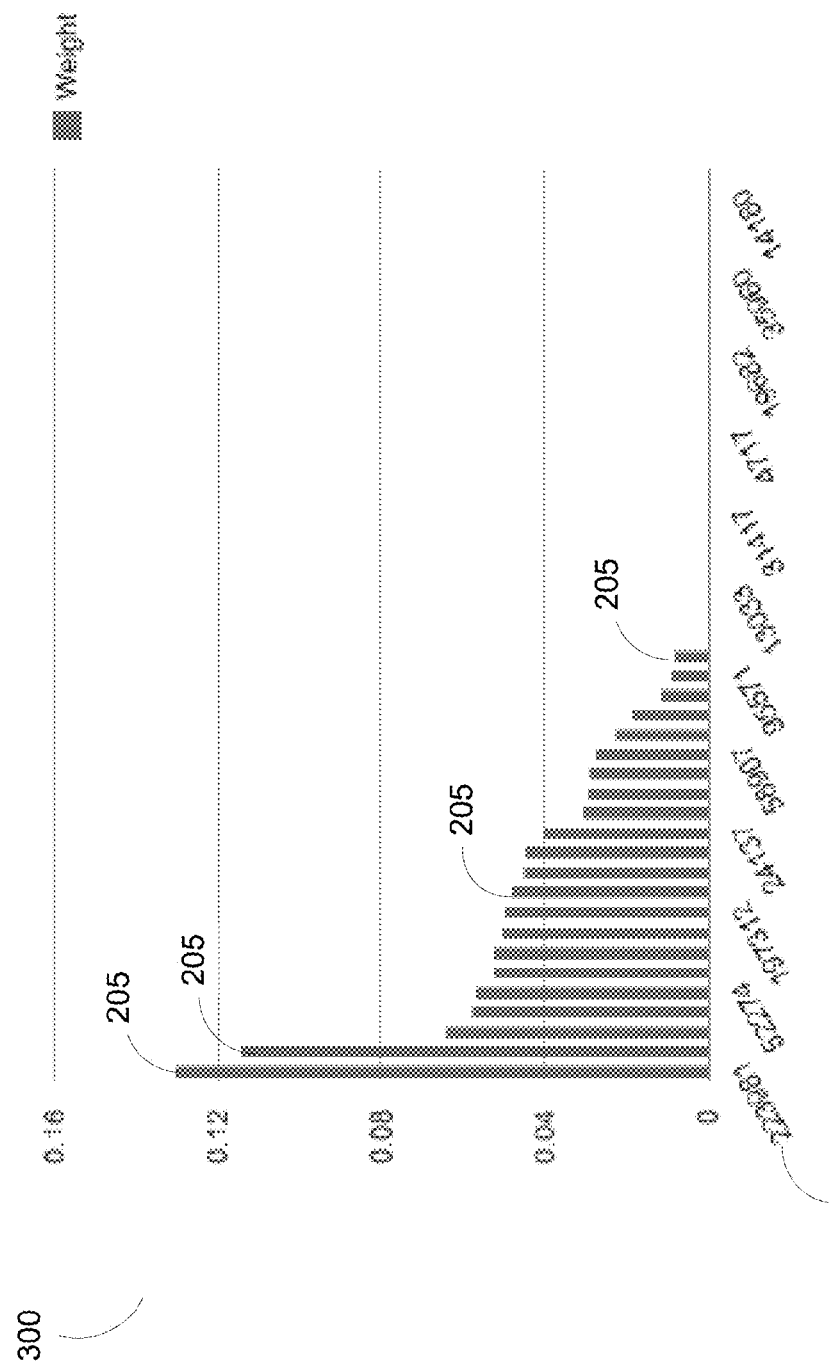
FIG. 3 is a display depicting cluster distribution associated with an information resource, according to an illustrative implementation.

FIG. 3 depicts another example cluster distribution chart 300 associated with an information resource, again where each vertical bar depicts a weight of one cluster of a plurality of clusters, the horizontal axis depicts a plurality of clusters, and the vertical axis indicates the weight of the clusters, with some of the clusters being identified by reference number 205. In this example, the cluster 205 having cluster identification number 223981, represented by the furthest vertical bar on the left of the distribution chart 300 has a weight of greater than 0.12. Of the clusters 205 identified by the data processing system 110 as being related to an information resource, this cluster 205 is the cluster having the strongest association with the information resource. The cluster 205 having the second strongest association with the information resource associated with the clusters 205 of the distribution chart 300 is represented by the vertical bar second from the left and has a weight (determined by the data processing system 110 based on the keywords or other content of that cluster and the subject matter of an information resource) of between 0.08 and 0.12. In this example, of the clusters identified by the data processing system 110 as being associated with an information resource, these two clusters 205 are the clusters with the strongest association with that information resource. In this example, the rightmost cluster 205 has a weight closest to zero and is the cluster with the weakest association with that information resource.

Figure 4:
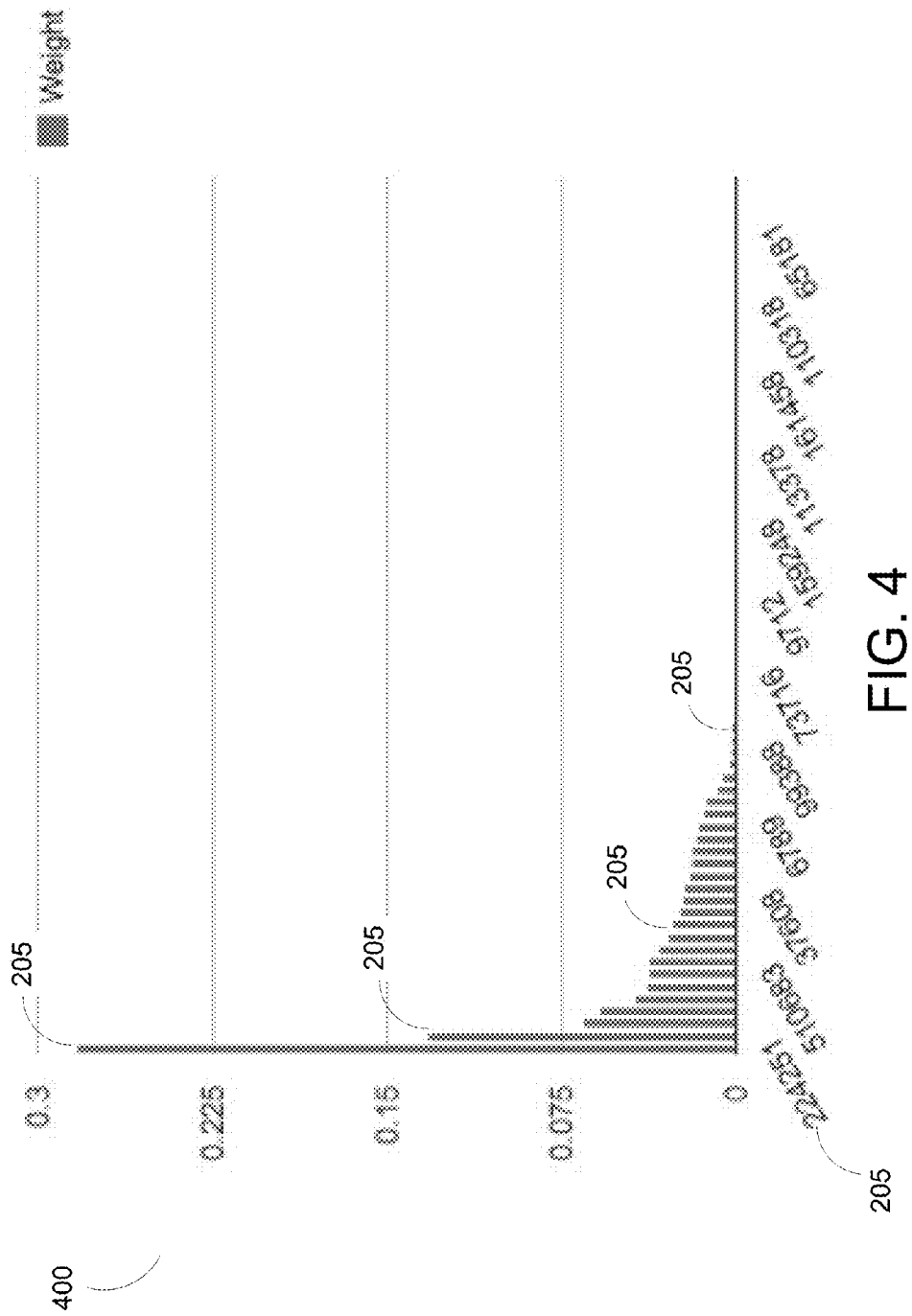
FIG. 4 is a display depicting cluster distribution associated with an information resource, according to an illustrative implementation.

FIG. 4 depicts another example cluster distribution chart 400 associated with an information resource, again where each vertical bar depicts a weight of one cluster of a plurality of clusters, the horizontal axis depicts a plurality of clusters, and the vertical axis indicates the weight of the clusters, with some of the clusters being identified by reference number 205. In this example, the cluster 205 having cluster identification number 224251, represented by the furthest vertical bar on the left of the distribution chart 400 has a weight of between 0.225 and 0.3 and is the cluster having the strongest association with the associated information resource. The cluster 205 having the second strongest association with the associated information resource of the distribution chart 400 is represented by the vertical bar second from the left and has a weight of between 0.075 and 0.15, which is approximately half of the weight of the cluster 205 having the strongest association with the information resource. In this example, the rightmost cluster 205 has a weight closest to zero and is the cluster with the weakest association with the information resource.

In some implementations, the data processing system 110 determines an association metric for the information resource. The data processing system 110 can identify the information resource as a specialized information resource or a general information resource based on the association metric. The association metric can indicate that the information resource is a specialized information resource, having a specific focus on one or a smaller number of topics, or a general information resource having a more distributed focus on a larger number of topics. For example, the data processing system 110 can determine an association metric for a website about a community of cat owners in the city of Seattle indicating that this information resource is a specialized information resource, and the data processing system 110 can determine an association metric for a website about cats in the animal kingdom is a general information resource.

Referring to FIGS. 2-4, the data processing system 110 can determine an association metric indicating that the information resource associated with the clusters of FIG. 2 is a general information resource based, for example, on the relatively low weights of the majority of the clusters and the relatively large number of clusters (e.g., a long non-zero tail of clusters) relative to FIGS. 3 and 4. For example, the long non-zero tail can indicate that the information resource includes a relatively large number of topics, and is more likely to be general in nature, indicative of a general information resource.

The data processing system 110 can determine an association metric indicating that the information resource associated with the clusters of FIG. 4 is a specialized information resource based, for example, on the relatively high weight of the highest weighted cluster, the gap in weight between that cluster and the remaining clusters, or the relatively small number of clusters having a non-zero weight relative to FIGS. 2 and 4. The data processing system 110 can determine an association metric indicating the information resource associated with FIG. 3 is either a specialized or general information resource, depending for example on weight and cluster numerosity thresholds used by the data processing system 110. These specialized or general cluster conclusions regarding FIGS. 2-4 are examples and the data processing system 110 can determine the opposite conclusion using the same or similar cluster and weight distributions for information resources, when compared to various thresholds or data from other information resources.

In some implementations, the data processing system 110 uses a machine learning model to identify information resources as potential candidates for display of content items that are the subject of a placement campaign. For example, the data processing system can extract clusters, keywords, language data, or locality data of the information resource to determine if the information resource is a potential candidate for display of the content item. Of those that are potential candidates, the information resource identification module 130 or other data processing system 110 component can further filter these information resources to identify specialized information resources.

In some implementations, the data processing system 110 determines the association metric based on a number of clusters that the data processing system 110 associates with the information resource, or based on the weight of at least one of those clusters. The association metric can indicate that at least one cluster associated with the information resource indicates that the information resource is a specialized information resource or a general information resource. For example, the data processing system 110 can determine that an association metric above a threshold value is a specialized information resource, or that an association metric below a threshold value is a general information resource.

In some implementations, the data processing system 110 or component thereof such as the information resource identification module 130 determines that a threshold percentage of information resources are specialized information resources. For example, the data processing system 110 can determine that the top 25% of information resources, e.g., those with the top quartile association metric, are specialized information resources, and the remaining 75% are general information resources. In one implementation, the data processing system 110 filters out 80% of information resources having clusters generally relevant to subject matter of a content item, and determines that the remaining 20% of information resources are specialized information resources. In this example, both the general and specialized information resources can include subject matter associated with content items, as indicated by clusters associated with the information resources and their weights; however the specialized information resource has a greater or more exclusive focus on a sub-set of subject matter relative to the general information resource. A content provider interested in providing a content item directed to this sub-set of subject matter may prefer placement of the content item with the specialized information resource, rather than the general information resource, due to the more exclusive focus of the sub-set of subject matter in the specialized information resource.

For example, the data processing system 110 can identify varying numbers of clusters associated with an information resource. For example, as indicated by vertical bars, with each vertical bar representing a weight of one cluster, the information resource associated with FIG. 2 is associated with a greater number of clusters than the information resources of FIG. 3 or FIG. 4. A large number of clusters associated with an information resource can indicate that the content or subject matter of the information is broader, more general, or less focused than another information resource that is associated with a smaller number of clusters and more specialized. For example, the data processing system 110 can determine that an information resource associated with a smaller number of clusters (as in FIG. 3 or FIG. 4) is more likely to be a specialized information resource than in information resource associated with a larger number of clusters (as in FIG. 2 when compared to FIG. 3 and FIG. 4).

The relative gap in weight between clusters associated with an information resource can also indicate whether or not the information resource is specialized or general in nature. For example, the highest weighted cluster 205 in the distribution chart 400 (approaching a weight of 0.3) is approximately double the weight of the next highest-weighted cluster, which is between 0.075 and 0.15 in the example of FIG. 4. Based on this weight gap between clusters, the data processing system 110 can determine that the information resource associated with FIG. 4 is a specialized information resource, specializing in content indicated by the highest weighted cluster.

In some implementations, the information resource identification module 130 or other data processing system 110 component determines the association metric for an information resource based on weights of at least one of the clusters associated with that information resource. For example, the data processing system 110 can determine an association metric indicative of a specialized website when a cluster associated with that website has a weight above a threshold value (e.g., above 0.225 as in FIG. 4), or when the variance or deviation (e.g., standard deviation) between cluster weights is greater than a threshold value. The data processing system 110 can also determine an association metric indicative of a specialized (or general) information resource based on a number of clusters associated with the information resource. For example, the data processing system 110 can determine that a number of clusters associated with the information resource that is less than a threshold value is a specialized information resource, and a number of clusters associated with an information resource that is above threshold value indicates a general information resource. In some implementations, the data processing system 110 determines association metrics for information resources based on both the number of clusters associated with that information resource and the weight of at least one of those clusters.

Referring to FIGS. 2-4, the cluster identification numbers on the horizontal axes are example identifiers to indicate specific clusters, stored for example in the database 140. Not all depicted clusters as represented by vertical bars indicating weights of the clusters are identified by cluster identification numbers in FIGS. 2-4, and not all clusters are explicitly labeled with reference identifier 205. The distribution charts 200, 300, and 400 are examples arranged in descending order from left to right indicating decreasing cluster weights and decreasing levels of clusters association with the corresponding information resource. In the examples of FIGS. 2-4, a higher weight indicates a stronger correlation between the cluster and the information resource, although this need not be the case. For example, the data processing system 110 can determine cluster weights in a binary, or yes-no manner, where a clusters associated with an information resource is determined to have an association indicating a specialized information resource (e.g., a yes or binary "1") or indicating a general information resource (e.g., a no or binary "0").

In some implementations, the data processing system 110 or component thereof such as the placement criteria identification module 135 selects at least one placement criterion for a content item. For example, a content provider using the content provider computing device 115 can provide information to the data processing system 110 via the network 105 to create or as part of an online content item placement campaign. This information can include at least one placement criterion indicating for example categories or types of information resources where the content provider would like to have a content item included for display at the end user computing devices 125. Placement criteria can also indicate the content of the content item.

For example, a content provider such as the owner of a cat food store in the city of Seattle can communicate using the content provider computing device 115 via the network 105 with the data processing system 110 to create an online content item placement campaign to provide ads for the cat food store in Seattle for placement with websites or other information resources. The data processing system 110 can receive, from the content provider computing device 115, information about the content items, about the types of information resources of interest to the content provider for display of the content items, or about products or services of the content provider. In some implementations, the data processing system 110 receives from the content provider computing device 115 a placement criterion such as a direct indication of an identified information resource that the content provider has selected as a candidate for display of a content item. For example, the cat food store owner in Seattle (a content provider) can send via the network 105 and the content provider computing device 115 a placement criterion to the data processing system 110 instructing or requesting placement of an ad for the cat food store (a content item) on a specific website identified by domain name, website address, or uniform resource locator (URL), such as a specialized website identified by domain name that is dedicated to care of domestic cats in the Pacific Northwest region of the United States.

The data processing system 110 can also select placement criteria based on information received from network sessions between the content publisher computing devices 120 and the end user computing devices 125. For example, the end user computing devices 125 can communicate with the content publisher computing devices 120 via the network 105 to display web pages of the content publisher computing devices 120 on the end user computing devices 125 during a network session. For example, one end user computing device 125 can visit multiple web pages during an internet browsing session and can click different instances (e.g., different impressions or renderings) of the same content item, or a related content item such as two different content items of one content provider. The data processing system 110 can obtain this information, e.g., via a cookie for the end user computing device 125 received via the network 105, and can determine that the multiple web pages visited during the session have common subject matter or are otherwise related, or that the end user computing device 125 has a higher than average probability of clicking certain content items or viewing certain subject matter relative to a threshold or general population of end user computing devices 125. The data processing system 110 can use this information to generate placement criteria or suggested information resources for the placement of content items as part of an online content item placement campaign. For example, a content item having subject matter similar to that of the multiple web pages that were visited by one end user computing device 125 during a browsing session may be suitable for display with any of those multiple web pages during subsequent online content item placement campaigns.

The information used to create placement criteria can be obtained by the data processing system 110 independent of or prior to creation of the online content item placement campaign. For example, this information can be stored in the database 140 and accessed by the data processing system 110 to generate placement criteria when a content provider computing device 115 contacts the data processing system 110 to create a new content item placement campaign. The data processing system 110 can obtain this information used to generate placement criteria for online content item placement campaigns without personally identifying any user of the end user computing device 125, or with the consent of an end user to receive this data.

In some implementations, the data processing system 110 obtains placement criteria used to select information resources for the placement of content items during content item placement campaigns based on search engine results or post-search engine result network activity by the end user computing devices 125. For example, the end user computing device 125 can communicate with a search engine via the network 105 and enter a query or search terms. The search engine may be part of the data processing system 110 or a separate system. Via the network 105 the search engine can provide search results for display by the end user computing device 125 on a search engine results landing web page. The end user computing device 125 can click on multiple links displayed on the landing web page to visit multiple different information resources. From this data the data processing system 110 can determine an association between these different information resources that were clicked, as they are sufficiently related to each other to be of interest to an end user of the end user computing device 125 responsive to a search query. This information can be stored in the database 140 and accessed by the data processing system 110 to generate placement criteria when a content provider computing device 115 contacts the data processing system 110 to create a new content item placement campaign.

In some implementations, the data processing system 110 selects a specialized information resource as a candidate for placement of at least one content item based on at least one placement criterion. For example, during the set up or creation of a content item placement campaign via the network 105, the placement criteria identification module 135 or other component of the data processing system 110 can determine placement criteria for the content items associated with the content item placement campaign. From this placement criteria (e.g., information received from the content provider computing device 115 identifying an information resource, or from historical data obtained from the content published computing devices 120 or from the end user computing devices 125 and stored in the database 140), the data processing system 110 can select at least one information resource as a candidate for display of the content items as part of the placement campaign. In some implementations, the data processing system 110 provides information identifying the selected candidate information resource via the network 105 to the content provider computing device 115 for display by the content provider computing device 115.

Figure 5:
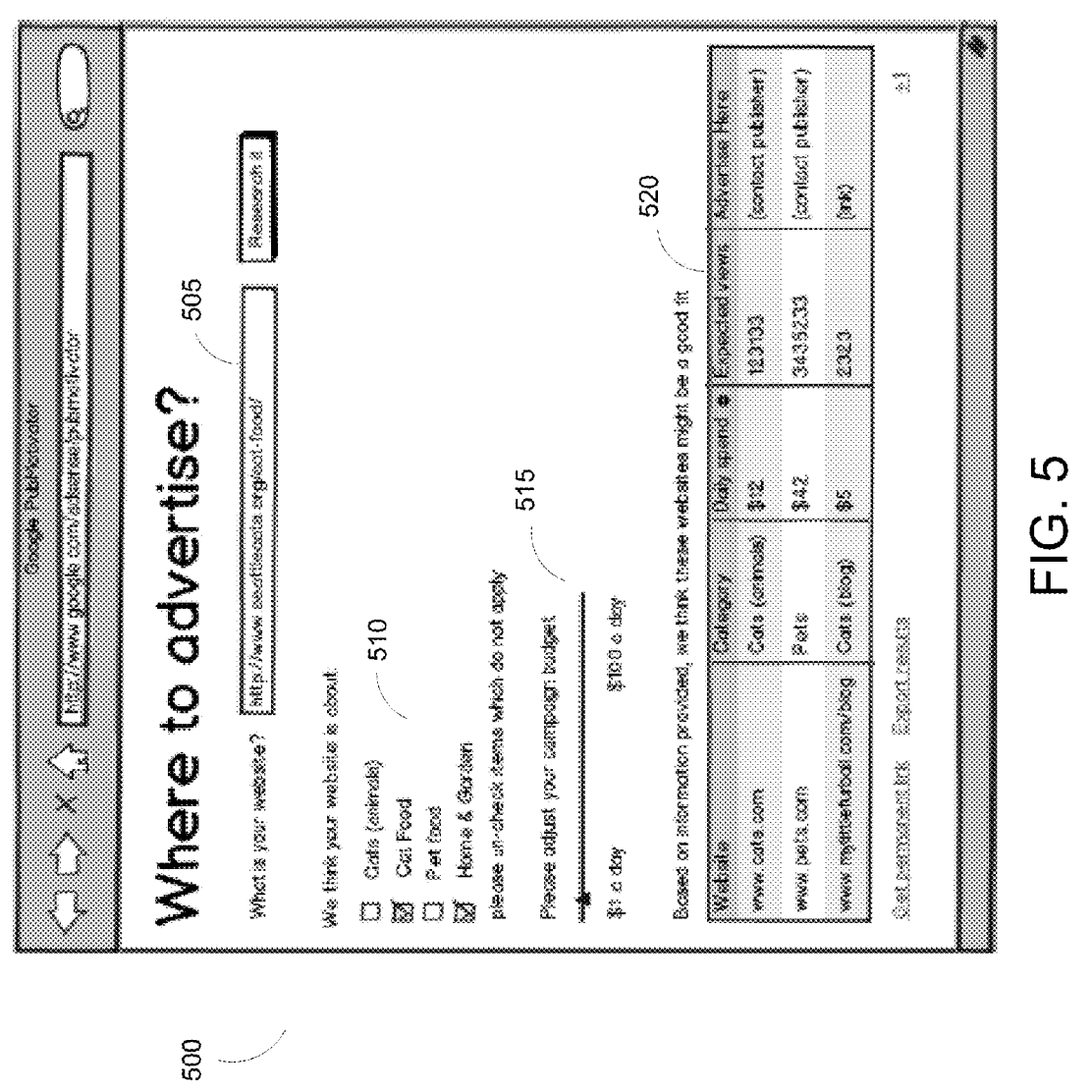

FIG. 5 depicts a user interface 500 provided from the data processing system 110 to the content provider computing device 115 for display by the content provider computing device 115 during the creation of an online content item placement campaign. For example, the content provider computing device 115 can communicate via the network 105 with the data processing system 110 to create a content item placement campaign to place content items of the content provider associated with the content provider computing device 115 with information resources of the content publisher computing devices 120. The data processing system 110 can prompt, via the user interface 500 displayed by the content provider computing device 115, for information used to create the placement campaign.

The user interface 500 can include at least one dialog box 505, e.g., a text window, interface or other area for display of a domain name, web address, or uniform resource locator (URL) indicating at least one content item or information resource of the content provider. For example the content provider associated with the content provider computing device 115 may be a vendor of cat food in the city of Seattle who can enter "http://www.seattlecats.org/cat-food/" into the dialog box 505. In this example, the content provider may intend to place content items (e.g., ads) on information resources of specialized content publishers that, when clicked, cause an impression or rending of a web page associated with the URL entered into the dialog box 505.

The user interface 500 can also include at least one placement criteria area 510 that can display content item data about the content items or information resources of the content provider. For example, the placement criteria area 510 can indicate placement criteria identified by the data processing system 110 that the website provided by the content provider is about "Cat Food" and "Home & Garden" as in the example of FIG. 5. In this example, specialized information resources of content publishers can be selected as candidates for display of a content item such as a link to the http://www.seattlecats.org/cat-food/ web page. The user interface 500 can also include a budget area 515 having one or more interfaces or prompts for the content provider via the content provider computing device 115 to enter budget information or parameters for the online content item placement campaign.

In some implementations, the user interface 500 includes at least one specialized information resource area 520. The specialized information resource area 520 can include a text box or dialog box for the display of specialized information resources selected as candidates for the placement of content items such as a link to the http://www.seattlecats.org/cat-food/ web page during implementation of the online content item placement campaign.

For example, via the dialog box 505 the content provider computing device 115 enters the URL http://www.seattlecats.org/cat-food/ indicating that the content provider would like to advertise this web page or the website http://www.seattlecats.org. The data processing system 110 can obtain this information and based on information received from the content provider computing device 115 or stored in the database 140 can determine that http://www.seattlecats.org/cat-food/ includes subject matter about cat food and home and garden subject matter, as indicated in the placement criteria area 510. The data processing system 110 can identify information resources having cat food or home & garden subject matter, and can identify which of those information resources are specialized information resources based on weights or clusters associated with those information or a number of clusters associated with those information resources. The indication of the specialized information resources can be provided from the data processing system 110 to the content provider computing device 115 via the network 105 for display, for example in the specialized information resource area 520 of the user interface 500 as candidates for display of links to http://www.seattlecats.org/cat-food/or to other content items related to this example URL.

In the example of FIG. 5, the specialized information resource area 520 identifies three specialized information resources, www.cats.com; www.pets.com; and www.mylittlefurball.com/blog. The specialized information resource area 520 can indicate additional information, such as a category associated with the specialized information resource, an estimated amount that the content provider would spend to place content items for display with the specialized information resource by the end user computing devices 125, an estimated number or renderings or views of the content provider's content item with the specialized information resources, as well as contact information of the content publisher associated with the specialized information resources. For example, the content provider can contact the content publisher to request permission to place content items with the information resource during the online content item placement campaign.

In some implementations, the end user computing device 125 can access the content publisher computing device 125 to request a rendering of the specialized information resource, e.g., the www.mylittlefurball.com/blog specialized information resource. The data processing system 110 can receive an indication of this request, and in response can provide the content item (e.g., a link to http://www.seattlecats.org/cat-food/) for display as a content item with a rendering or impression of the specialized information resource at the end user computing device 125.

The data processing system 110 can also determine that the specialized information resource, in addition to being a specialized information resource, (e.g., cats.com) includes subject matter that matches subject matter of the content item, (e.g., http://www.seattlecats.org/cat-food/). For example, based on subject matter as indicated in the placement criteria area 510, data obtained by the data processing system 110 from the content publisher computing device 120 associated with the information resource, from the content provider computing device 115 associated with the content item, or from the end user computing devices 125, the data processing system 110 can determine an association score indicative of subject matter overlap or semantic closeness between the specialized information resource and the content item, and can select the specialized information resource as a candidate for placement of the content item based on the association score. For example, the data processing system 110 can compare the association score to a threshold value or to association scores of other information resources to select the specialized information resource as a candidate for placement of the content item. The data processing system 110 can adjust the association score based on information received from the content providing computing device 115 about the information resource, such as a direct request to provide content items for display with a particular information resource, or based on network activity of the end user computing device 125.

In some implementations, the data processing system 110 determines an association score between a first specialized information resource and a content item, and uses this association score to determine an association score for a second information resource. For example, the data processing system 110 can determine that the second information resource is sufficiently similar in subject matter to the first information resource, based on subject matter similarity or views by common end user computing devices, and can assign the same or a similar association score to the second information resource and the same content item, or to the second information resource and a second content item similar to the first content item. In this example, the data processing system 110 can estimate or predict relationships between content items and information resources based on other, similar information resources or content items rather than direct information from the information resources and content items themselves.

Figure 6:
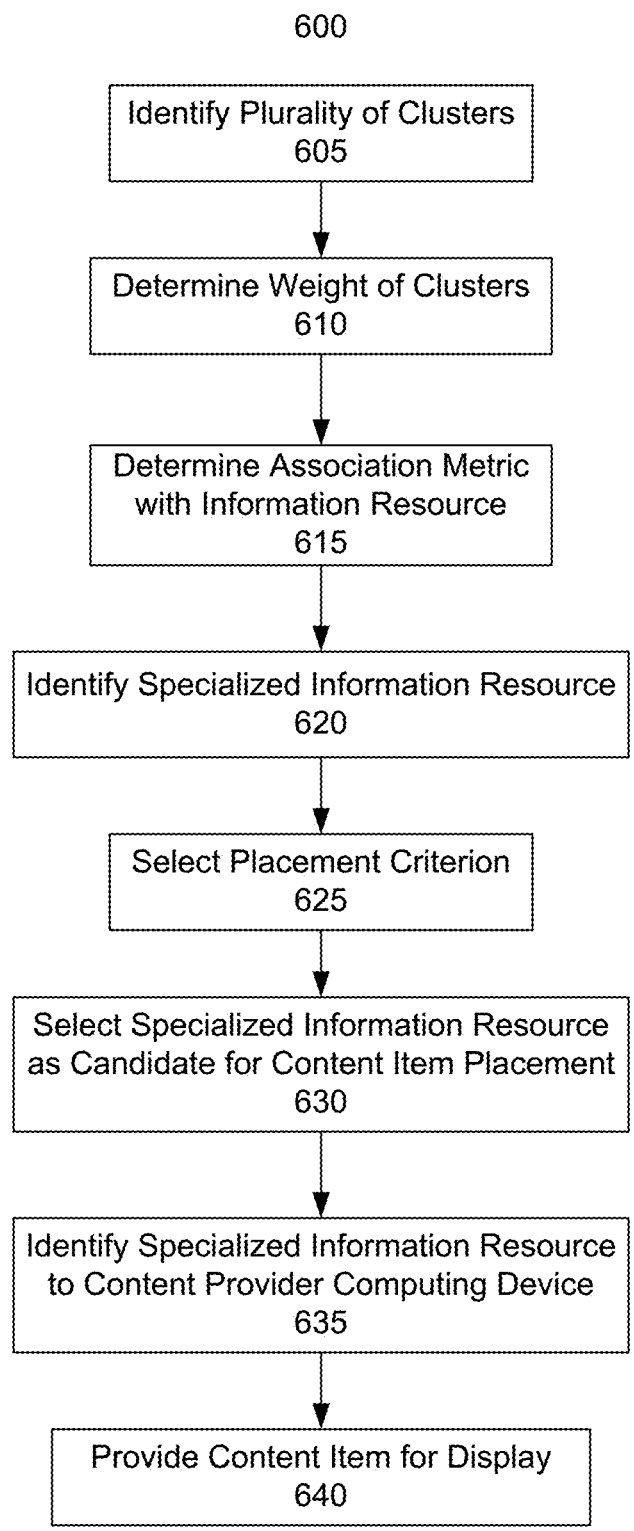
FIG. 6 is a flow diagram depicting an example method of identifying information resources for content item placement, according to an illustrative implementation.

FIG. 6 is a flow diagram depicting an example method 600 of identifying information resources for content item placement. The method 600 can include identifying a plurality of clusters associated with an information resource (ACT 605). For example, the data processing system 110 can communicate with the content provider computing device 115 to create an online placement campaign to place a content item on information resources. To identify information resources that can host the content items (e.g., in content item slots of web pages of the information resources) the data processing system 110 can identify one or more clusters associated with the information resource (ACT 605) for example by comparing information about the information resource to information stored in the database 140.

The method 600 can also include an act of determining a weight of the clusters associated with the information resource (ACT 610). For example, the data processing system 110 can determine a weight of the clusters that indicates how closely the keywords of the cluster match the content of the information resource. The method 600 can also include an act of determining an association metric of the information resource (ACT 615). For example, the data processing system 110 can determine an association metric for the information resource based on how many clusters are identified (ACT 605) for the information resource, or based on the determined weight (ACT 610) of the clusters. The method 600 can include an act of identifying the information resource as a specialized information resource based on the association metric (ACT 620).

The method 600 can also include an act of selecting a placement criterion for the content item (ACT 625). For example, the data processing system 110 can select at least one placement criterion for a content item (ACT 625) based on information received by the data processing system 110 from the content provider computing device 115. The data processing system 110 can select at least one placement criterion for a content item (ACT 625) based on information received by the data processing system 110 from sessions between the end user computing devices 125 and the content publisher computing devices 120 via the network 105. Based for example on at least the placement criterion, the data processing system 110 can select the specialized information resource as a candidate for placement of the content item (ACT 630).

In some implementations, the method 600 includes an act of identifying the specialized information resource to the content provider computing device 115 (ACT 635). For example, during creation of a content item placement campaign the data processing system 110 can communicate via the network 105 with the content provider computing device to display an indication of the specialized information resource. The method 600 can also include an act of providing the content item for display with the specialized information resource (ACT 640). For example, the data processing system 110 can include a content item or ad server to provide the content item to the end user computing device 125 or to the content publisher computing device 120 for display with the specialized information resource by the end user computing device.

Thus, in some implementations, the data processing system 110 can indicate to content providers which information resources are better suited for their content items, for example by providing information about specialized information resources for display by the content provider computing device 115. By identifying a subset of specialized information resources from the larger group of general information resources that also include subject matter related to the content items, the data processing system 110 can identify websites or other information resources focused on specific topics that may be rendered by end user computing devices 125 for display to users. While the specialized information resources may be smaller in terms of traffic, volume or rate of page views, or geographic limitations (e.g., a website only relevant in a specific area), the users viewing specialized information resources may have a higher level of interest in a specific topic or subtopic and thus may have a higher likelihood to click or otherwise convert the content item on the specialized information resource, relative to users of a general information resource that may have some subject matter similar to the specialized information resource, but that also includes additional subject matter having lesser or no relation to the content item that is the subject of the content item placement campaign.

Figure 7:
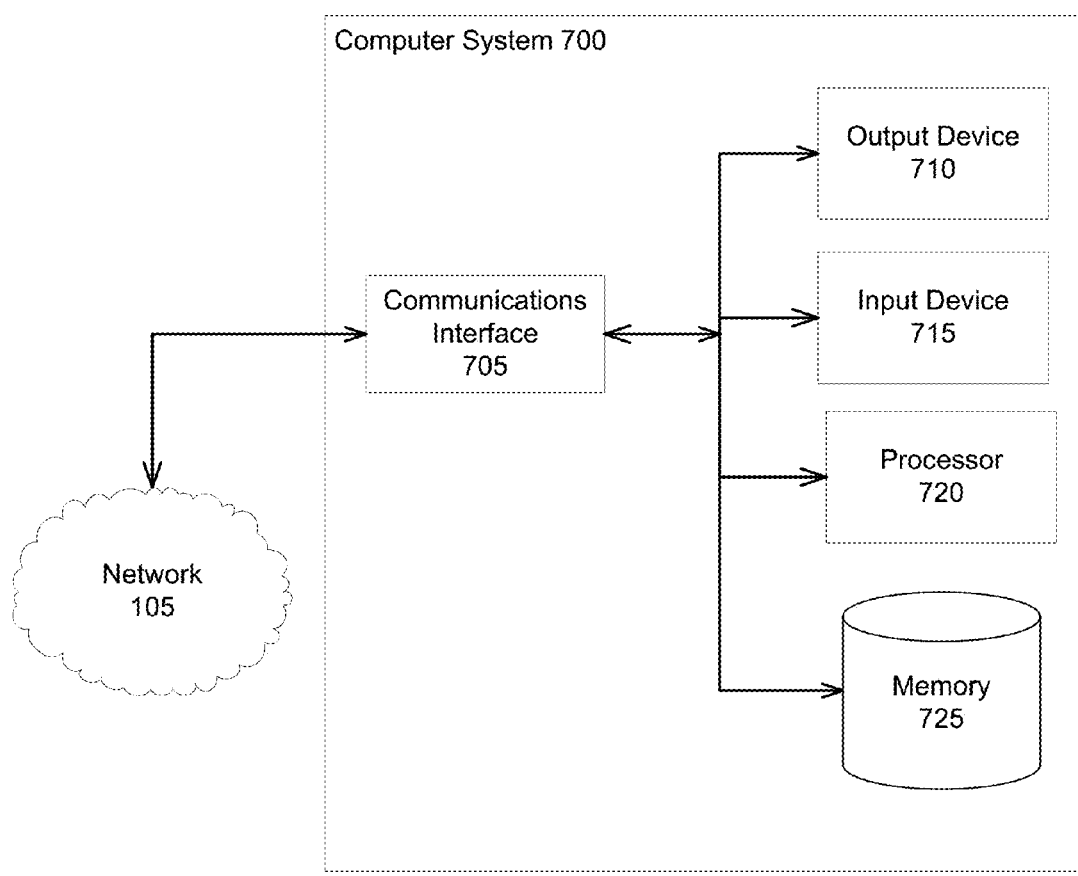
FIG. 7 is a block diagram illustrating a general architecture for a computer system that may be employed to implement elements of the systems and methods described and illustrated herein, according to an illustrative implementation.

FIG. 7 shows the general architecture of an illustrative computer system 700 that may be employed to implement any of the computer systems discussed herein (including the system 100 and its components such as the data processing system 110, the information resource identification module 130 or the placement criteria identification module 135) in accordance with some implementations. The computer system 700 can be used to provide information via the network 105, for example to identify information resources as specialized information resources and to select content items suitable for display by the specialized information resources. The computer system 700 includes one or more processors 720 communicatively coupled to at least one memory 725, one or more communications interfaces 705, and one or more output devices 710 (e.g., one or more display units) and one or more input devices 715. The processors 720 can be included in the data processing system 110 or the other components of the system 100 such as the information resource identification module 130 or the placement criteria identification module 135.

The memory 725 can include computer-readable storage media, and can store computer instructions such as processor-executable instructions for implementing the operations described herein. The information resource identification module 130, the placement criteria identification module 135, or the database 140 can include the memory 725 to store placement criteria, information about content items, information about information resources, or information used to differentiate general information resources from specialized information resources, e.g., threshold values. The processor(s) 720 can execute instructions stored in the memory 725 and can read from or write to the memory information processed and or generated pursuant to execution of the instructions.

The processors 720 can be communicatively coupled to or control the communications interface(s) 705 to transmit or receive information pursuant to execution of instructions. For example, the communications interface(s) 705 can be coupled to a wired or wireless network, bus, or other communication means and can allow the computer system 700 to transmit information to or receive information from other devices (e.g., other computer systems). One or more communications interfaces 705 can facilitate information flow between the components of the system 100. In some implementations, the communications interface(s) can be configured (e.g., via hardware components or software components) to provide a website as an access portal to at least some aspects of the computer system 700. Examples of communications interfaces 705 include user interfaces.

The output devices 710 can allow information to be viewed or perceived in connection with execution of the instructions. The input device(s) 715 can allow a user to make manual adjustments, make selections, enter data or other information, or interact in any of a variety of manners with the processor during execution of the instructions.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content server.

The term "data processing system" or "computing device" "module" "engine" "component" or "computing device" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The information resource identification module 130 and the placement criteria identification module 135 can include or share one or more data processing apparatuses, systems, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 700 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While operations are depicted in the drawings in a particular order, this should not be understood as requiring that such operations be performed in the particular order shown or in sequential order, or that all illustrated operations are required to be performed. Actions described herein can be performed in a different order.

The separation of various system components does not require separation in all implementations, and the described program components can be into a single hardware or software product. For example, the information resource identification module 130 and the placement criteria identification module 135 can be a single module, a logic device having one or more processing circuits, or part of an online content item placement system.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementation," "an alternate implementation," "various implementation," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of identifying information resources for content item placement, comprising:

receiving, from a content provider computing device via a computer network, a content item for placement identifying a plurality of candidate information resources for placement of the content item;

for each of the plurality of candidate information resources:

identifying, by a data processing system, a plurality of clusters associated with the candidate information resource, each cluster of the plurality of clusters including a plurality of keywords;

determining a number of clusters in the plurality of clusters;

determining, by the data processing system, a weight of each of the plurality of clusters for the candidate information resource based at least in part on the plurality of keywords;

determining a highest weight from among the plurality of clusters; and determining, by the data processing system, an association metric for the candidate information resource based on a number of clusters in the plurality of clusters and the weight of each of the plurality of clusters;

determining, by the data processing system, that a first information resource of the plurality of candidate information resources has a first association metric greater than a predetermined threshold, wherein determining that the first association metric is greater than the predetermined threshold comprises:

determining that the first information resource has a first number of clusters less than a first predetermined proportion of the number of clusters determined for each of the plurality of the candidate information resources; and determining that the first information resource has a first highest weight greater than a second predetermined proportion of highest weights determined for each of the plurality of the candidate information resources;

identifying, by the data processing system, the first information resource as a specialized information resource based on the determination that the first association metric is greater than the predetermined threshold;

selecting, by the data processing system, a placement criterion for the content item based on at least one of:
  information received by the data processing system from the content provider computing device via the computer network; and
  information received by the data processing system from a network session between at least one end user computing device and at least one content publisher computing device via the computer network; and
selecting, based on the placement criterion, the specialized information resource as a candidate for placement of the content item.

2. The method of claim 1, comprising:
determining, by the data processing system, that a second information resource of the plurality of candidate information resources has a second association metric below the predetermined threshold;
identifying, by the data processing system, the second information resource as a general information resource and not a second specialized information resource based on the determination that the second association metric is below than the predetermined threshold;
determining, by the data processing system, that the general information resource is not a candidate for placement of the content item.

3. The method of claim 1, comprising:
identifying, to the content provider computing device, the specialized information resource as the candidate for placement of the content item via a communication from the data processing system to the content provider computing device using the computer network.

4. The method of claim 1, comprising:
providing the content item for display by an end user computing device via the computer network.

5. The method of claim 1, comprising:
identifying the placement criterion for the content item based on at least one of: click data received by the data processing system from at least one end user computing device via the computer network; and search data received by the data processing system indicative of search result activity by at least one end user computing device via the computer network.

6. The method of claim 1, comprising:
determining an association score between the specialized information resource and the content item; and
selecting the specialized information resource as the candidate for placement of the content item based on the association score.

7. The method of claim 1, comprising:
determining a first association score between the specialized information resource and the content item; and
using the first association score to determine a second association score between a second information resource and a second content item.

8. The method of claim 1, wherein the specialized information resource is a website associated with the content publisher computing device and the content item is an advertisement associated with the content provider computing device.

9. The method of claim 1, wherein the specialized information resource is a first specialized information resource, the method further comprising:
identifying a second information resource as a second specialized information resource based on the association metric of at least one of the plurality of clusters with the first specialized information resource; and
selecting the second specialized information resource as a second candidate for placement of the content item via the computer network.

10. The method of claim 1, wherein determining that the first association metric is greater than a predetermined threshold comprises:
determining, for each of the plurality of the candidate information resources, a relative gap between the highest weight and a next highest weight; and
determining that the first information resource has a first relative gap greater than a third predetermined proportion of relative gaps determined for each of the plurality of the candidate information resources.

11. A system of filtering information resources for content item placement, comprising a data processing system configured to:
receive, from a content provider computing device via a computer network, a content item for placement;
identify a plurality of candidate information resources for placement of the content item;
for each of the plurality of candidate information resources:
  identify a plurality of clusters associated with the candidate information resource, each cluster of the plurality of clusters including a plurality of keywords;
  determine a number of clusters in the plurality of clusters;
  determine a weight of each of the plurality of clusters for the candidate information resource based at least in part on the plurality of keywords;
  determine a highest weight from among the plurality of clusters; and
  determine an association metric for the candidate information resource based on a number of clusters in the plurality of clusters and the weight of each of the plurality of clusters;
determine that a first information resource of the plurality of candidate information resources has a first association metric greater than a predetermined threshold, wherein determining that the first association metric is greater than the predetermined threshold comprises:
  determine that the first information resource has a first number of clusters less than a first predetermined proportion of the number of clusters determined for each of the plurality of the candidate information resources; and
  determine that the first information resource has a first highest weight greater than a second predetermined proportion of highest weights determined for each of the plurality of the candidate information resources;
identify the first information resource as a specialized information resource based on the determination that the first association metric is greater than the predetermined threshold;
identify a placement criterion for the content item based on at least one of:
  information received by the data processing system from a content provider computing device via the computer network; and
  information received by the data processing system from a network session between at least one end user computing device and at least one content publisher computing device via the computer network; and
select the specialized information resource as a candidate for placement of the content item via the computer network based on the placement criterion.

12. The system of claim 11, comprising:
the data processing system configured to provide the content item for display by an end user device via the computer network.

13. The system of claim 11, comprising:
the data processing system configured to determine an association score between the specialized information resource and the content item; and to
select the specialized information resource as the candidate for placement of the content item based on the association score.

14. The system of claim 11, comprising:
the data processing system configured to identify the placement criterion for the content item based on at least one of: click data received from at least one end user computing device via the computer network; and search data indicative of search result activity by at least one end user computing device via the computer network.

15. The system of claim 11, wherein the specialized information resource is a first specialized information resource, comprising the data processing system configured to:
identify a second information resource as a second specialized information resource based on the association metric of at least one of the plurality of clusters with the first specialized information resource; and
select the second specialized information resource as a second candidate for placement of the content item via the computer network.

16. The system of claim 11, comprising:
the data processing system configured to compare the association metric with a threshold to identify a second information resource as a non-specialized information resource.

17. The system of claim 11, wherein determining that the first association metric is greater than a predetermined threshold comprises:
determining, for each of the plurality of the candidate information resources, a relative gap between the highest weight and a next highest weight; and
determining that the first information resource has a first relative gap greater than a third predetermined proportion of relative gaps determined for each of the plurality of the candidate information resources.

18. A non-transitory computer readable storage medium storing instructions that when executed by one or more data processors, cause the one or more data processors to perform operations comprising:
receiving, from a content provider computing device via a computer network, a content item for placement
identifying a plurality of candidate information resources for placement of the content item;
for each of the plurality of candidate information resources:
identifying a plurality of clusters associated with the candidate information resource, each cluster of the plurality of clusters including a plurality of keywords;
determining a number of clusters in the plurality of clusters;
determining a weight of each of the plurality of clusters for the candidate information resource based at least in part on the plurality of keywords;
determining a highest weight from among the plurality of clusters; and
determining an association metric for the candidate information resource based on a number of clusters in the plurality of clusters and the weight of each of the plurality of clusters;
determining that a first information resource of the plurality of candidate information resources has a first association metric greater than a predetermined threshold, wherein determining that the first association metric is greater than the predetermined threshold comprises:
determining that the first information resource has a first number of clusters less than a first predetermined proportion of the number of clusters determined for each of the plurality of the candidate information resources; and
determining that the first information resource has a first highest weight greater than a second predetermined proportion of highest weights determined for each of the plurality of the candidate information resources;
identifying the first information resource as a specialized information resource based on the determination that the first association metric is greater than the predetermined threshold;
selecting a placement criterion for the content item based on at least one of:
information received by the data processing system from the content provider computing device via the computer network; and
information received by the data processing system from a network session between at least one end user computing device and at least one content publisher computing device via the computer network; and
selecting, based on the placement criterion, the specialized information resource as a candidate for placement of the content item.

19. The non-transitory computer readable storage medium of claim 18, wherein the instructions that when executed by the one or more data processors, cause the one or more data processors to perform operations comprising:
comparing the association metric with a threshold to identify a second information resource as a non-specialized information resource.

20. The non-transitory computer readable storage medium of claim 18, wherein the instructions that when executed by the one or more data processors, cause the one or more data processors to perform operations comprising:
identifying the placement criterion for the content item based on at least one of click data from at least one end user computing device, and search data indicative of search result activity by at least one end user computing device.

* * * * *